US008750687B2

(12) United States Patent  (10) Patent No.: US 8,750,687 B2
Hubner et al.  (45) Date of Patent: Jun. 10, 2014

(54) METHOD AND APPARATUS FOR MANAGING DIGITAL VIDEO RECORDERS

(75) Inventors: Paul Hubner, McKinney, TX (US); Scott J. Hoover, Allen, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 367 days.

(21) Appl. No.: 12/816,849

(22) Filed: Jun. 16, 2010

(65) Prior Publication Data

US 2011/0311206 A1 Dec. 22, 2011

(51) Int. Cl.
*H04N 5/91* (2006.01)
*H04N 5/76* (2006.01)

(52) U.S. Cl.
USPC .................. 386/299; 386/297; 386/E5.03

(58) Field of Classification Search
USPC ....... 725/112, 87; 386/124, 299, 297, E5.003
See application file for complete search history.

(56) References Cited

U.S. PATENT DOCUMENTS

| | | | |
|---|---|---|---|
| 2003/0009766 A1* | 1/2003 | Marolda | 725/97 |
| 2004/0258390 A1* | 12/2004 | Olson | 386/46 |
| 2006/0088062 A1* | 4/2006 | Arsenault et al. | 370/477 |
| 2006/0109854 A1* | 5/2006 | Cancel | 370/401 |
| 2007/0118857 A1* | 5/2007 | Chen et al. | 725/61 |
| 2007/0156739 A1* | 7/2007 | Black et al. | 707/102 |
| 2009/0100478 A1* | 4/2009 | Craner et al. | 725/87 |
| 2009/0193482 A1* | 7/2009 | White et al. | 725/110 |
| 2009/0220216 A1* | 9/2009 | Marsh et al. | 386/124 |
| 2010/0061708 A1* | 3/2010 | Barton | 386/124 |
| 2010/0325675 A1* | 12/2010 | Smoyer et al. | 725/97 |
| 2011/0010746 A1* | 1/2011 | Howarter et al. | 725/112 |
| 2011/0142422 A1* | 6/2011 | Friedman | 386/297 |
| 2012/0114313 A1* | 5/2012 | Phillips et al. | 386/298 |

* cited by examiner

*Primary Examiner* — Thai Tran
*Assistant Examiner* — Nien-Ru Yang

(57) ABSTRACT

An approach is provided for managing digital video recorders. One or more parameters related to a digital video recorder are retrieved. A configuration message is generated, at a set-top box, for transmission over a data network to a data repository. The set-top box is coupled to the digital video recorder. The configuration message specifies the one or more parameters.

16 Claims, 10 Drawing Sheets

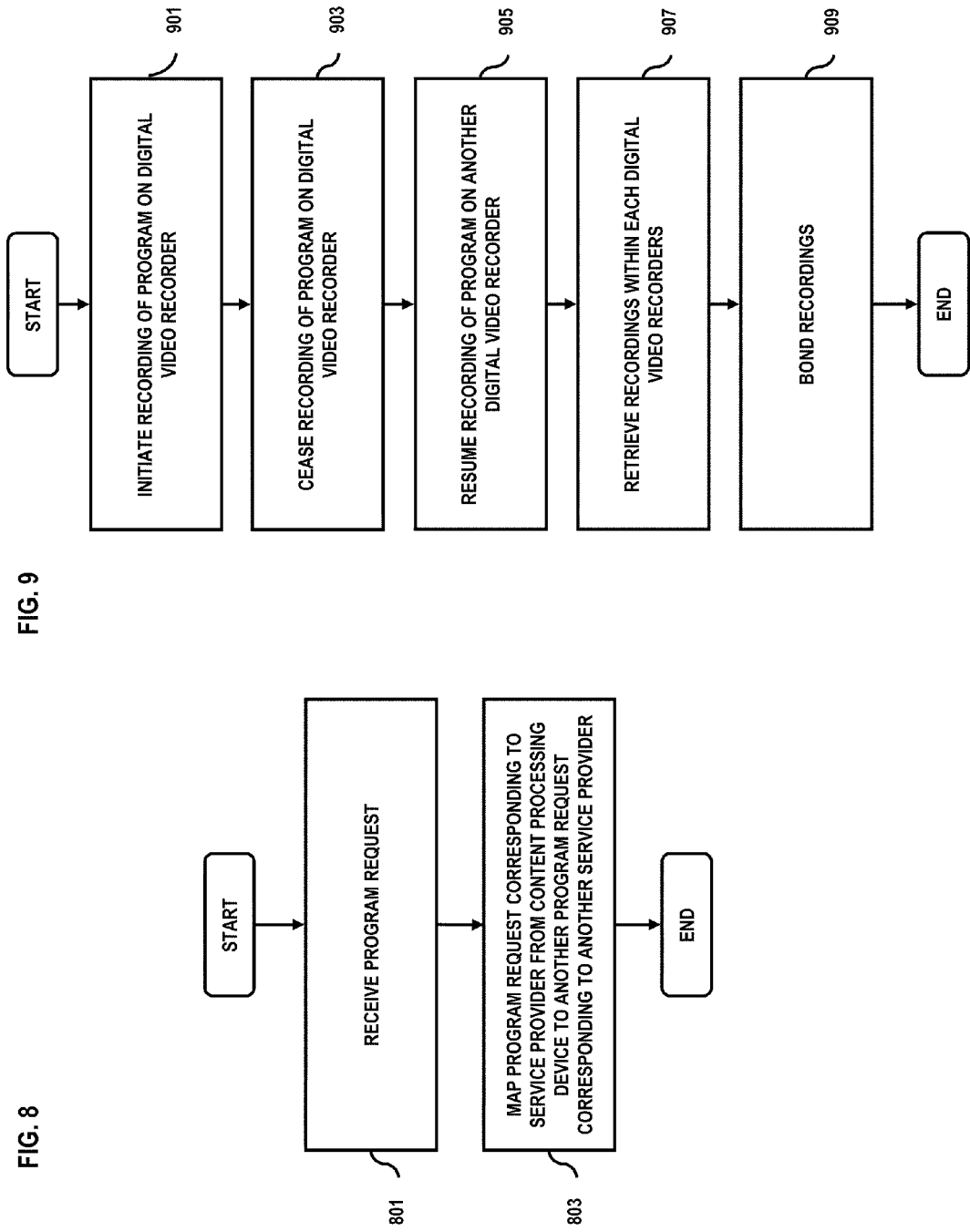

METHOD AND APPARATUS FOR MANAGING DIGITAL VIDEO RECORDERS

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. Traditionally, broadcast media, being based on pre-computer age technology, has developed on its own path, without any regard to other media systems. With readily available, cost-effective broadband services, bandwidth intensive applications, such as audio and video streaming, have become viable mediums. Also, there has been substantial growth in the use of set-top boxes (STBs) equipped with digital video recording capabilities. Through the digital video recorder (DVR), a user may record content, such as a television program, to a memory medium so that the program may be viewed by the user at a more convenient time. The user may also be able to fast-forward or skip the unwanted sections of the program, as well as rewind to watch the program again. Further, the user may be able to set the configuration, such as weekly recording of television programs, for the DVR. Unfortunately, there is little flexibility in the way that information, such as content, record requests, or configurations, is saved or accessed.

Therefore, there is a need for an approach that provides flexible, efficient techniques to store and retrieve information related to digital video recording.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 8 is a flowchart of a process for mapping programming requests among different service providers, according to an exemplary embodiment;

FIG. 9 is a flowchart of a process for recording and bonding a program using multiple DVRs, according to an exemplary embodiment.

DESCRIPTION OF THE PREFERRED EMBODIMENT

A preferred apparatus, method, and software for managing digital video recorders are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing content (e.g., audio/video (AV)) signals for presentation to a user, such as a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), and/or a personal computer (PC), as well as other like technologies and customer premises equipment (CPE).

Figure 1:
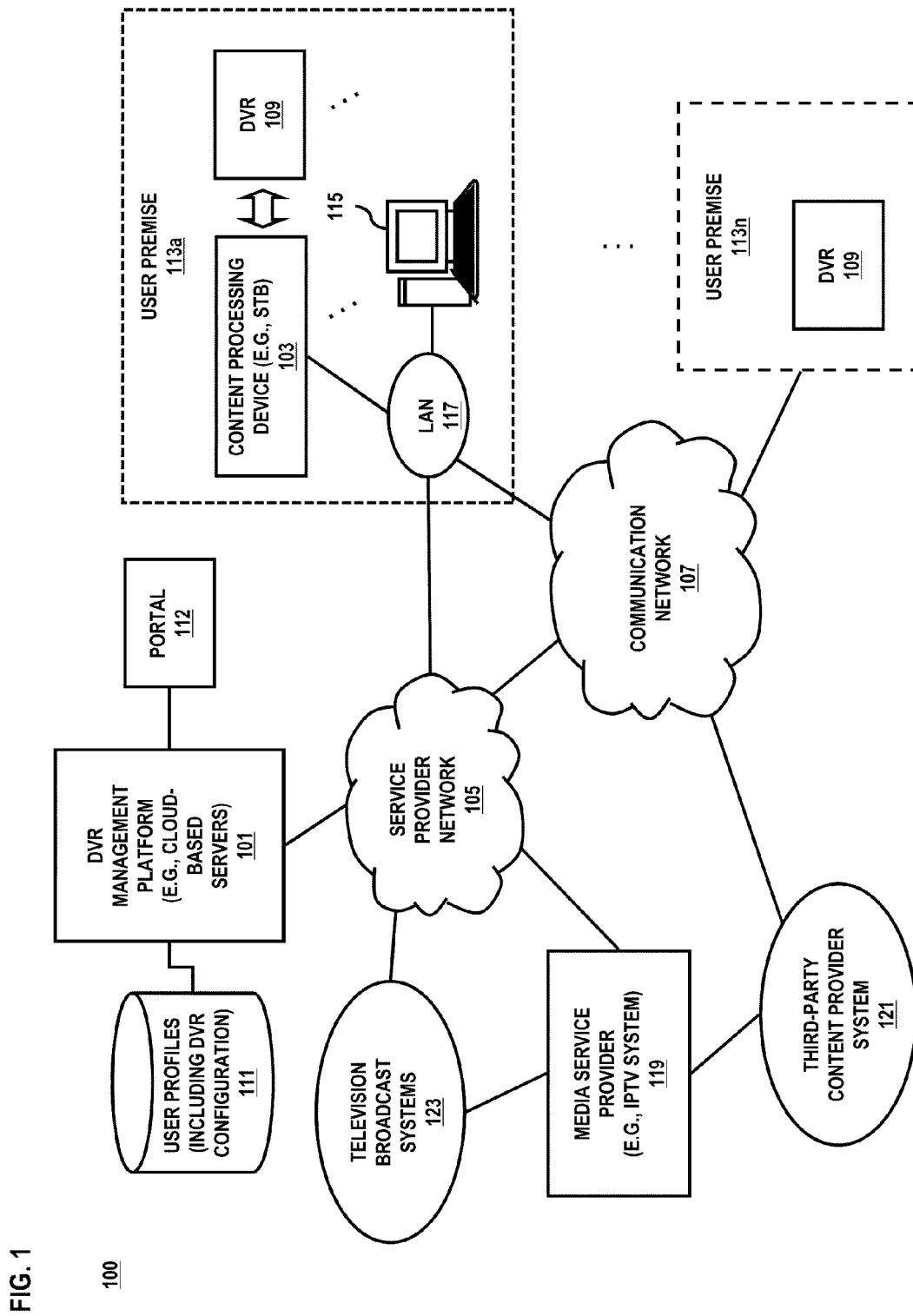
FIG. 1 is a diagram of a system capable of managing digital video recorders (DVRs), according to an exemplary embodiment.

FIG. 1 is a diagram of a system capable of managing digital video recorders (DVRs), according to an exemplary embodiment. For the purposes of illustration, system 100 is described with respect to DVR management platform (or platform) 101 that is configured to interface with content processing devices (e.g., set-top boxes (STBs)) 103 through service provider network 105 and/or communication network 107. As used herein, a DVR or PRV (personal video recorder) device can be either a standalone DVR 109 or an integrated unit of content processing device and DVR. System 100 may be configured to support increased flexibility and efficiency in the way that information is saved or accessed. As such, users are not limited to traditional methods of recording content, configuring content processing device 103, or accessing the content. While specific reference will be made hereto, it is contemplated that system 100 may embody many forms and include multiple and/or alternative components and facilities. As will be more fully described, DVR management platform 101 permits parameters associated with DVR configuration, programming guides, and personal recording settings to be maintained within the network, thereby enabling ease of configuration restoration and effective management of DVR resources. DVR resources, in certain embodiments, include disk capacity, processor, tuner circuitry, etc. Also, DVRs can be standalone, combined with STBs, or implemented using a personal computer (i.e., PC-based device); hence, "DVR resources" would refer to system resources of these various implementations.

It is observed that television remains the prevalent global medium for entertainment and information as individuals spend a great deal of time tuning into televised media. With the introduction of the DVR, consumers are able to record content, such as televised media, to a memory medium so that the content may be accessed at a later time. Digital video recording systems offer consumers the ability to watch their favorite programs at a more convenient time by appropriately scheduling recording and later accessing of various programs for viewing. Typically, such programming of the DVR (i.e., setting user preferences for scheduling of the programs)

requires a rather long, steady investment of time and effort to set recording preferences, as DVRs generally do not permit recording of future programs that are beyond a certain time period before the actual broadcast of the subject programs. This window of time is usually short, e.g., a few days or a week. Consequently, this programming process necessarily must be performed over an extended period of time to recover all programs. Hence, the loss of such information would impose a great burden on the viewer to attempt to replicate the information (even assuming the viewer is willing and can accurately recall what programs were selected for recording. As an example of a typical programming process, a user, who wants to record an upcoming episode of "Program A," must place the show on the DVR recording schedule. Also, for example, the user must decide whether he/she would like to set the DVR to repeatedly record "Program A" for the rest of the season, and perhaps how long each episode of "Program A" should remain available for access after recording before it is automatically deleted. The user must then repeat this process for each and every show that the user would like to save for later, leisurely viewing.

Furthermore, in typical multi-DVR environments, the resources (e.g., storage space) are independently managed and cannot be shared. For example, the user must individually configure and program the many DVRs throughout the user premise (e.g., home). Moreover, the user may record the same program over multiple DVRs if the user wants the option of the viewing location (e.g., family room, basement, bedroom, etc.). As such, the traditional recording systems can be very tedious and inefficient.

It is further recognized that users often replace hardware (e.g., STBs) for various reasons, including hardware failure and upgrades. Traditionally, the users would be required to reenter all of their personal settings onto the new hardware, which as explained is a cumbersome task.

Thus, the approach of system 100, according to certain embodiments, stems from the recognition that consumers can benefit from the ability to preserve their user profiles and automatically (or by request) reinstate their user profiles after an event that would generally necessitate data restoration or programming.

As shown, system 100 includes DVR management platform 101 that may be configured to store user profiles, which include DVR configurations, in user profile repository (or repository) 111. In this manner, system 100 relieves users from the tedious and time-consuming task of having to input their previous settings onto the new devices by interfacing with content processing device(s) 103 in the respective user premise (e.g., 113a-113n) and automatically (or by request) restoring the user profiles from repository 111. Among other functions, system 100 can be configured to restore settings or other content after any loss of data (e.g., software failure). In further embodiments, user profiles may also include DVR configuration, programming guide information relating to programs available via content processing device 103, user recording settings relating to recording schedules of the programs (e.g., record requests), or a combination thereof.

In one embodiment, DVRs 109 (e.g., in conjunction with corresponding STB 103) individually copy this data to DVR management platform 101 for storage and processing. It is noted that this process does require storage of the actual video content. DVRs 109 may log into platform 101 using pre-defined user/account credentials. Platform 101 may retain a current record list of programs to record as well as a history of what was to be recorded. Further, platform 101 can merge all the user's DVR profiles into a single "To Do" list", retaining the associated DVR and profile requesting each record session. Reassignment of the recording requests can also be performed by platform 101. Once the profile owner has watched the recorded program, the associated record indicator can be deleted from the profile. When all profiles requesting that program designate that the program is to be deleted, the actual media can then deleted from the respective DVR storing the subject content.

In certain embodiments, a portal 112 interfaces with DVR management platform 101 to permit access by users via STBs 103 and/or computing device 115 (e.g., laptop, desktop, web appliance, netbook, etc.). Portal 112 provides, for example, a web-based user interface to allow users to set and update user profile information and DVR related settings.

By way of example, content processing device 103 and/or computing device 115 may be configured to communicate using one or more of networks 105 and 107. System 107 can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect content processing devices 103 to various sources of media content, such as one or more third-party content provider systems 121. Although depicted in FIG. 1 as separate networks, communication network 107 may be completely or partially contained within service provider network 105. For example, service provider network 105 may include facilities to provide for transport of packet-based communications.

According to certain embodiments, content processing devices 103 and/or computing devices 115 may be configured to communicate over one or more local area networks (LANs) corresponding to user premises 113a-113n. In this manner, routers (not shown) may be used for establishing and operating, or at least connecting to, a network such as a "home" network or LAN 117, and is used to route communications within user premises 113a-113n. For example, content processing device 103 may be a set-top box communicatively coupled to LAN 117 via a router and a coaxial cable, whereas computing devices 115 may be connected to LAN 117 via a router and a wireless connection, a network cable (e.g., Ethernet cable), and/or the like. It is noted, however, that in certain embodiments content processing device 103 may be configured to establish connectivity with LAN 117 via one or more wireless connections. Further, content processing device 103 and computing device 115 may be uniquely identified by LAN 117 via any suitable addressing scheme. For example, LAN 117 may utilize the dynamic host configuration protocol (DHCP) to dynamically assign "private" DHCP internet protocol (IP) addresses to content processing device 103 and computing devices 115, i.e., IP addresses that are accessible to devices such as devices 103 and 115 that are part of LAN 117 facilitated via router, i.e., connected to a router.

Accordingly, it is noted that user premises 113a-113n may be geospatially associated with one or more regions, as well as one or more user accounts. As such, content processing devices 103 associated with these user premises 113a-113n may be configured to communicate with and receive information from DVR management platform 101. This information may include content or user profile information among many other things. Additionally, content processing devices 103 associated with these user premises 113a-113n may be configured to communicate with and receive signals and/or data streams from media service provider (MSP) 119 (or other transmission facility, e.g., third-party content provider system 121). These signals may include media content retrieved over a data network (e.g., service provider network 105 and/or communication network 107), as well as conventional video broadcast content.

As used herein, media content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. In this manner, MSP 119 may provide (in addition to their own media content) content obtained from sources, such as one or more third-party content provider systems 121, one or more television broadcast systems 123, etc., as well as content available via one or more communication networks 107, etc.

According to certain embodiments, platform 101 provides a number of functions that enable treatment of the DVRs 109 as a collective group of networked resources. One function provides for the recovery of DVR parameters upon replacing or newly provisioning a DVR. As further explained with respect to FIG. 4, other functions include manipulation of where recordings can be performed among the DVRs 109 within a single premise 113a or over multiple premise 113a-113n. For instance, instead of potentially losing a recording opportunity, platform 101 can intelligent determine which DVR among a group of DVRs possesses sufficient storage space to either wholly store the recording or partially store the recording. The partial storage of programs can thus be stitched together virtually—i.e., the actual content can be stored among multiple DVRs 109, but played back through a single DVR.

In addition, DVR management platform 101 can apply a merging function to consolidate, on a temporary basis or permanently, DVR configuration information among multiple user profiles. In this way, a user associated with one account can effectively overlay the user's DVR parameters to another user's account, for example, when the user is temporarily residing with this other user.

Moreover, platform 101 provides a social network function, whereby users can share information during viewing of a particular program. These users can be dynamically formed within the community of subscribers when DVR management platform 101 detects presence of these users experiencing a common program (e.g., movie or TV show).

DVR management platform 101 can also support multiple service provider systems, as detailed below in FIG. 4, in the scheduling of media content for recording across multiple service provider systems. Specifically, platform 101 can translate or mapping the programming/scheduling information (which are likely to be different among different providers) corresponding to a record request for one service provider system to identify the identical program in a second service provider system. In this way, users who subscribe to different service providers can nevertheless share DVR scheduling information to effectively replicate each others' DVR configurations.

In various embodiments, DVR management platform 101 may be configured to allow remote control (complete or shared) of content processing device 103 and DVR 109. In further embodiments, remote control may be selectively or conditionally disabled (e.g., when content processing device 103 and DVR 109 is accessed locally or set to be controlled locally).

Also, DVR management platform 101 may be configured to report to an account owner on the record requests per content processing device 103/DVR 109. While system 100 is illustrated in FIG. 1, the exemplary components are not intended to be limiting, and indeed, additional or alternative components and/or implementations may be utilized.

Figure 2:
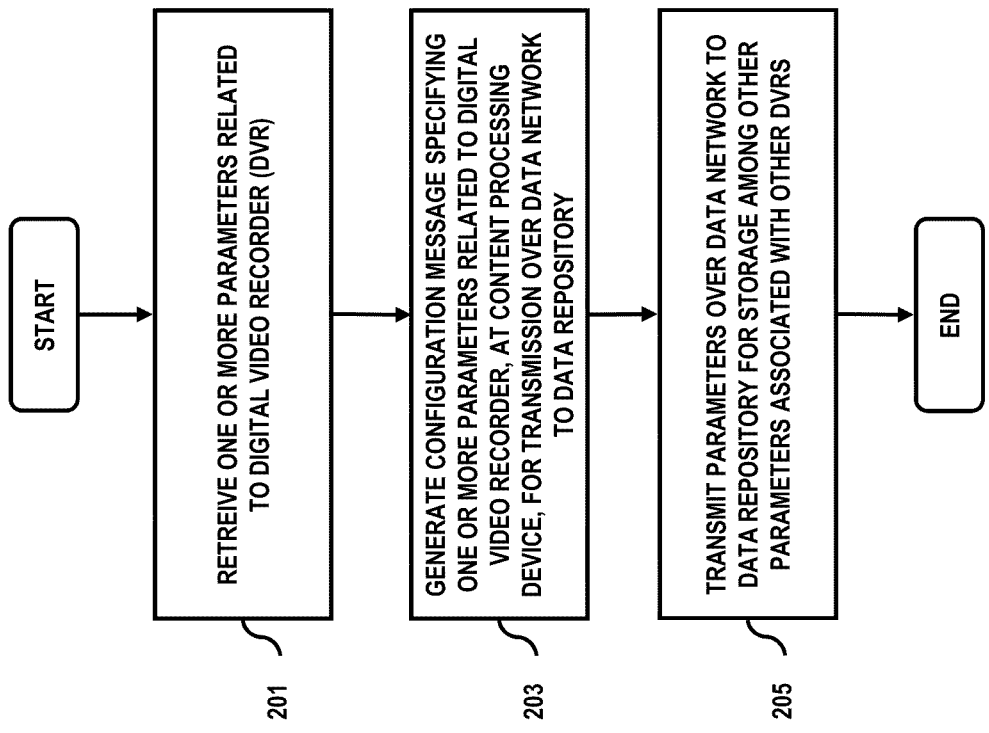
FIG. 2 is a flowchart of a process for storing DVR parameters within a service provider network, according to an exemplary embodiment.

FIG. 2 is a flowchart of a process for storing DVR parameters within a service provider network, according to an exemplary embodiment. For illustrative purposes, the process is described with respect to FIG. 1. It is noted that the steps of the process may be performed in any suitable order, as well as combined or separated in any suitable manner. In step 201, content processing device 103, which is associated with DVR 109, retrieves one or more DVR-related parameters. As previously mentioned, according to one embodiment, the parameters may include configuration information of the digital video recorder, programming guide information relating to media content (e.g., programs) available via content processing device 103 (e.g., STB), user recording settings relating to a recording schedule of the programs, or a combination thereof. It is also noted that the parameters may include various user profile information, such as, for example, username and password information, other service provider associated account information, billing information, configuration information, and the like, as well as one or more other parameters, values, variables, numbers, keys, etc., previously described and/or other like user profile information, such as personal user profile information, e.g., user demographics, group/organizational affiliations, memberships, interests, etc. It is further noted that the parameters may include addressing (or otherwise uniquely identifying) information associated with specified user devices, such as, for example, one or more directory addresses, electronic serial numbers, international mobile equipment identifiers, machine access control addresses, mobile directory numbers, mobile equipment identities, mobile identification numbers, internet protocol addresses, port addresses, and/or any other suitable address (or identifier). As such, the parameters may include one or more user-defined attributes and/or policies for carrying out functions of platform 101.

Once the parameters are retrieved, content processing device 103, per step 203, generates a configuration message, specifying the parameters retrieved, for transmission over a data network (e.g., service provider network 105 and/or communication network 107) to a data repository (e.g., repository 111). Subsequently, in step 205, content processing device 103 transmits the parameters over the data network to the data repository for storage among other parameters associated with other DVRs. As illustrated in FIG. 1, according to certain embodiments, content processing device 103 may be configured to communicate with the data network via one or more LANs 117.

Figure 3:
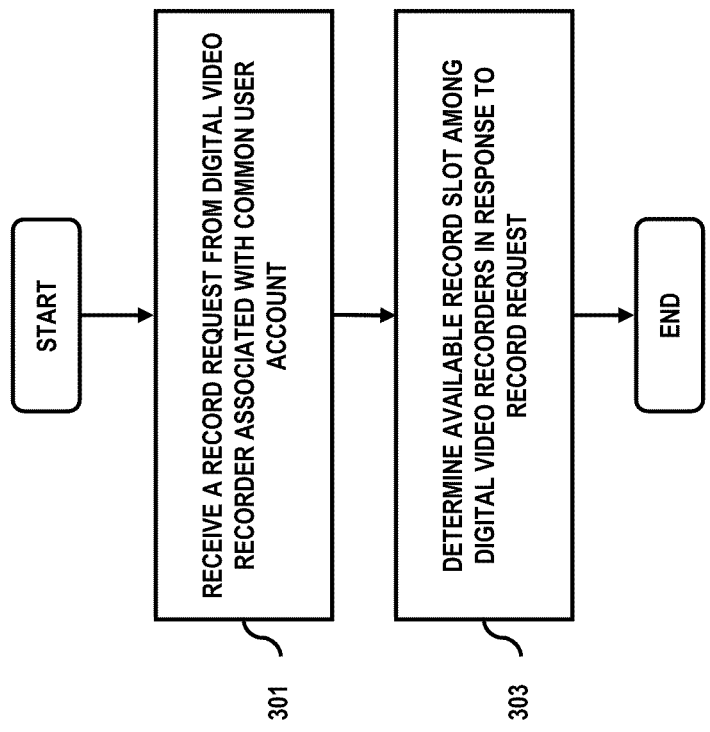
FIG. 3 is a flowchart of a process for managing DVRs to record program content, according to an exemplary embodiment.

FIG. 3 is a flowchart of a process for managing DVRs to record program content, according to an exemplary embodiment. For the purpose of illustration, the processes are described with respect to FIG. 1. It is noted that the steps of the processes may be performed in any suitable order, as well as combined or separated in any suitable manner. At step 301, platform 101 receives a record request from a DVR associated with a common user account. In response to the record request, platform 101 then determines whether there is an available record slot among the DVRs associated with the common user account (per step 303).

Figure 4:
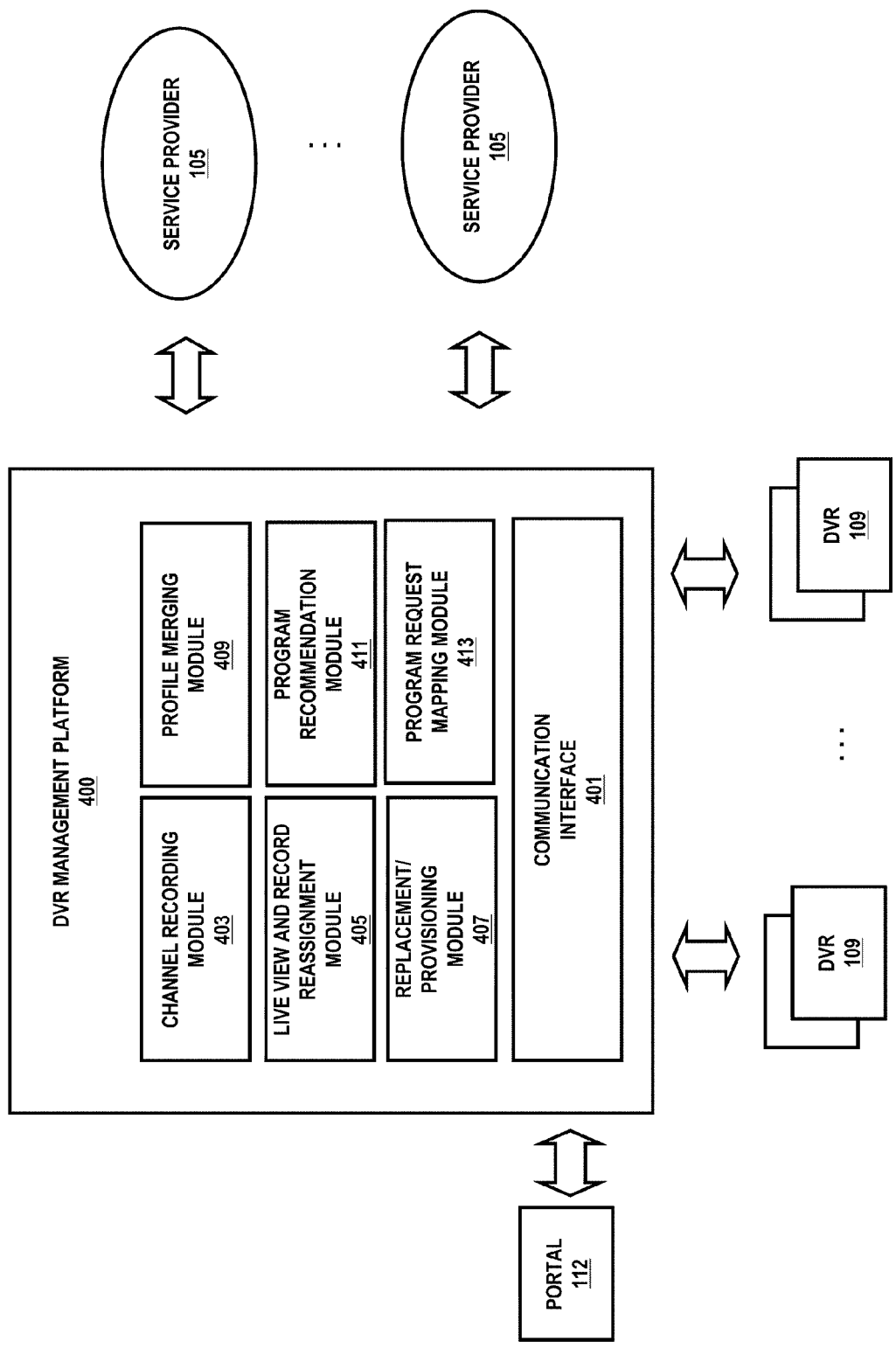
FIG. 4 is a diagram of a DVR management platform, according to an exemplary embodiment.

FIG. 4 is a diagram of a DVR management platform, according to an exemplary embodiment. DVR management platform (or platform) 400 may comprise computing hardware (such as described with respect to FIG. 10), as well as include one or more component configured to execute the processes describe herein for facilitating the management of DVRs. In one implementation, platform 400 includes communication interface 401, channel recording module 403, live view and record reassignment module 405, replacement/provisioning module 407, profile merging module 409, program recommendation module 411, and program request mapping module 413. Communication interface 401 provides connectivity to one or more DVRs within a single premise or across multiple premises; this interface 401 can also communicate with various service provider systems 105. Interface 401 can also support communication with portal 112, which enables users to access platform 400 via, e.g., browser applications.

As shown, DVR management platform 400 provides a channel recording module 403 to manage the storage spaces among multiple DVRs 109. It is recognized that the STB 103/DVR 109 has a limit on the number of simultaneous channels available for access or recording. Thus, in various embodiments, DVR management platform 101 may be configured to store record requests in user profile repository 111. Hence, DVR management platform 101 is able to parse through the record requests against the total number of available channels for recording within the respective user premise (e.g., 113a-113n) and assign, via channel recording module 403, record requests across all DVRs 109 within the respective user premise (rather than merely the particular DVR requesting the recording). In this manner, platform 400 extends the number of simultaneous recording that may be made via individual content processing devices 103.

Furthermore, according to particular embodiments, a DVR is able to access content recorded on other DVRs 109 across the various user premises 113a-113n. Thus, platform 400 relieves users from being restricted to recording or viewing content from a particular device.

Live view and record reassignment module 405, in certain embodiments, tracks the use of each record channel associated with DVRs 109 within each user premise 113a-113n. In the event that the user exceeds the number of available record channels on one DVR, the module 405 can accept a record request and reassign it to an open record channel on the user's other DVRs. For example, if a particular DVR of the user is about to run out of available recording space during a recording session, module 405 determines whether the remaining session can be assigned to another DVR 109. If the other DVR 109 has available recording space, module 405 can start recording the remaining session on the available DVR and stop the original recording session. The actual video content may be stored in one or multiple locations across the user's DVRs. Subsequently, platform 400 can bond the two recordings into this "virtual" (i.e., stored among multiple DVRs) recording for playback, or consolidate the recording to one DVR at a later time. In another embodiment, platform 400 can determine, prior to starting a recording session, to assign the entire recording to a particular DVR that possesses sufficient available space. Furthermore, because viewing of live broadcast programs can be restricted, in some circumstances, to the programs that are being recorded, live view and record reassignment module 405 can redirect the requested recordings to another DVR if such restriction is imposed on a desired STB/DVR.

Replacement/provisioning module 407, in one embodiment, provides restoration of DVR parameters upon replacement of a DVR or provisioning of a new DVR (e.g., for a common user account). That is, module 407 allows DVRs to be provisioned based on the predecessor DVR's configuration data, which may be transferred to the subject DVR from user profiles database 111. By way of example, DVR configuration data can relate to monitor size, audio/video interface (e.g., High-Definition Multimedia Interface (HDMI)) setup, audio settings, time zone, network address settings, etc), programming guides (e.g., available channels, blocked and hidden channels settings, skin preferences, customizations, etc.) and personal recording settings (e.g., show names, times record types (e.g., all, single, series, latest), record channels, etc.)).

DVR platform 400 also utilizes a profile merging module 409, which allows users to merge their user profile information, such as record requests, with user profiles of other users. As such, profile merging module 409 may perform the merge option in a number of ways, including obtaining the first user profile from user profile repository 111 and then merging information from the first user profile with a second user profile. The time period in which the second user profile retains the information of the first user profile may be temporary or permanent. For example, a user may be away from his/her premise 113a on a temporary basis, such as visiting an out-of-town family member or friend for a significant duration. From the friend's house, the user can log into the user's account using a compatible DVR, and instruct platform 400 to merge the user's record requests with the friend's user profile. Accordingly, profile merging module 409 performs the merge of the profile information, such that the user can readily and conveniently experience the users' favorite programs while away from home.

According to one embodiment, the merge function can be performed for DVRs 109 of a common user account. That is, the profiles for the these DVRs 109 can be merged.

In addition to accessing user profiles from user profile repository 111 for personal review or restoration, platform 400 supports social network functions, such as providing recommendations about certain channels, programs, etc. In other words, user profiles may be shared with other users and/or be used to provide user-to-user recommendations (e.g., recommending a television series for recording) via STB 103 to other STBs. Upon receiving a recommendation, the recipient may be provided with an option to reject or accept the recommendation. Additionally, in one embodiment, platform 400 may be configured to provide a list of recommendations to users based on preferences in their user profile. For example, such recommendations may relate to ratings, time, channel, resolution, actors, users with similar taste, etc. It is also contemplated that program recommendation module 411, in certain embodiments, can provide a social network service within a community of STBs 103/DVRs 109.

Platform 400 utilizes, in one embodiment, a program request mapping module 413 to map or translate programming information among different service provider systems 105. In other words, DVR management platform 400 may be configured to map a record request (e.g., a request for a particular show) to alternate channel assignments. Module 413 can receive a record request for a program offered by a first service provider. It is noted that the description or information to identify this program may be different, in terms of format and description, than that of the same program being offered by a second service provider. Thus, module 413 can maintain a listing of programs for each of the service providers and correlate the program listing using various context data (e.g., actors, title, date, etc.). Based on the request associated with the first service provider, module 413 produces an equivalent record request that is compatible with the second service provider. By way of example, the subject program may be scheduled for broadcast on a certain time and channel in the first service provider system, while the same program is on a different time and/or channel in the second service provider system. Under this scenario, module 413 would map the time and channel appropriately. For example, a Media Service Provider X record request ("Program A" on channel 120 @ 9 pm EST) could be translated to a Media Service Provider Y record request (channel 278 @ 6 pm PST).

While specific reference will be made to this particular implementation, it is also contemplated that platform 400 may embody many forms and include multiple and/or alternative components. For example, it is contemplated that the components of platform 400 may be combined, located in separate structures, and/or separate locations. That is, platform 400 may be implemented as cloud-based servers.

Figure 5:
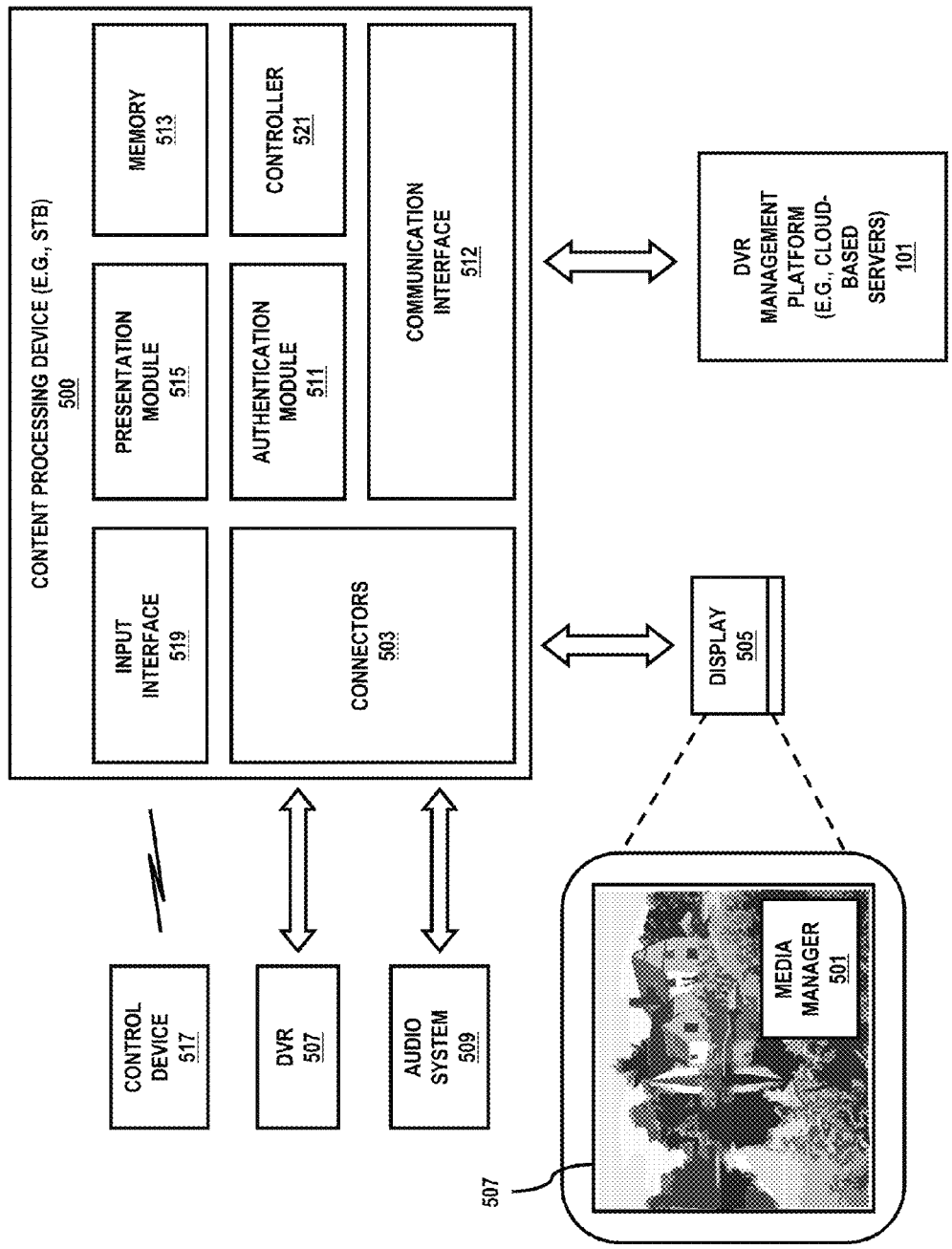
FIG. 5 is a diagram of a content processing device (e.g., set-top box) configured to facilitate store DVR parameters, according to an exemplary embodiment.

FIG. 5 is a diagram of a content processing device (e.g., set-top box) configured to facilitate store DVR parameters, according to an exemplary embodiment. Content processing device (or device) 500 may comprise any suitable technology to receive one or more content streams from a media source, such as MSP 119 and one or more third-party content provider systems 121. The content streams include media content retrieved over one or more data networks (e.g., networks 105 and/or 107), in response to commands from one or more media applications (e.g., media manager 501).

According to various embodiments, device 500 may also include inputs/outputs (e.g., connectors 503) to display 505 and DVR 507, as well as to audio system 509. In particular, audio system 509 may comprise a conventional audio-video receiver capable of monaural or stereo sound, as well as multichannel surround sound. Audio system 509 may include speakers, ear buds, headphones, or any other suitable component configured for personal or public dissemination. As such, content processing device 500, display 505, DVR 507, and audio system 509, for example, may support high resolution audio and/or video streams, such as high definition television (HDTV) or digital theater systems high definition (DTS-HD) audio. Thus, content processing device 500 may be configured to encapsulate data into a proper format with required credentials before transmitting onto one or more of the networks of FIG. 1 and de-encapsulate incoming traffic to dispatch data to display 505 and/or audio system 509.

In an exemplary embodiment, display 505 and/or audio system 509 may be configured with internet protocol (IP) capability (i.e., includes an IP stack, or is otherwise network addressable), such that the functions of content processing device 500 may be assumed by display 505 and/or audio system 509. In this manner, an IP ready, HDTV display or DTS-HD audio system may be directly connected to one or more service provider networks 105 and/or communication networks 107. Although content processing device 500, display 505, DVR 507, and audio system 509 are shown separately, it is contemplated that these components may be integrated into a single component, or other combination of components.

An authentication module 511 may be provided by content processing device 500 to initiate or respond to authentication schemes of, for instance, service provider network 105, third-party content provider systems 121, or various other content providers, e.g., television broadcast systems 123, etc. Authentication module 511 may provide sufficient authentication information, e.g., a user name and password, a key access number, a unique machine identifier (e.g., MAC address), and the like, as well as combinations thereof, to a corresponding communications (or network) interface 512 for establishing connectivity, via LAN 117, and to DVR management platform 101. Authentication at content processing device 500 may identify and authenticate a second device (e.g., computing device 115) communicatively coupled to, or associated with, content processing device 500, or vice versa. Further, authentication information may be stored locally at memory 513, in a repository (not shown) connected to content processing device 500, or at a remote repository (e.g., user profile repository 111).

Authentication module 511 may also facilitate the reception of data from single or disparate sources. For instance, content processing device 500 may receive broadcast video from a first source (e.g., MSP 119), signals from a media application at second source (e.g., computing device 115), and a media content stream from a third source accessible over communication networks 107 (e.g., third-party content provider system 121). As such, display 505 may present the broadcast video, media application, and media content stream to the user, wherein content processing device 500 (in conjunction with one or more media applications) can permit users to experience various sources of media content traditionally limited to the data domains. This presentation may be experienced separately, concurrently, in a toggled fashion, or with zooming, maximizing, minimizing, or trick capabilities, or equivalent mode. In other exemplary embodiments, authentication module 511 can authenticate a user to allow them to interact with one or more third-party subscriber account features associated with third-party content provider systems 121.

Presentation module 515 may be configured to receive media content streams (e.g., audio/video feed(s) including media content retrieved over a data network) and output a result via one or more connectors 503 to display 505 and/or audio system 509. In this manner, presentation module 515 may also provide a user interface for a media application via display 505. Aural aspects of media applications may be presented via audio system 509 and/or display 505. In certain embodiments, media applications, such as media manager 501, may be overlaid on the video content output 507 of display 505 via presentation module 515. The media content streams may include content received in response to user input specifying media content that is accessible by way of one or more third party content provider systems 105 and, thereby, available over at least one data network (e.g., network 105 and/or 107), wherein the media content may be retrieved and streamed by content processing device 500 for presentation via display 505 and/or audio system 509. Accordingly, presentation module 515 may be configured to provide lists of search results and/or identifiers to users for selection of media content to be experienced. Exemplary search results and/or identifiers may include graphical elements, channels, aural notices, or any other signifier, such as a uniform resource locator (URL), phone number, serial number, registration number, MAC address, code, etc.

Connector(s) 503 may provide various physical interfaces to display 505, audio system 509, as well as other peripherals; the physical interfaces may include, for example, RJ45, RJ11, high definition multimedia interface (HDMI), optical, coax, FireWire, wireless, and universal serial bus (USB), or any other suitable connector. The presentation module 515 may also interact with control device 517 for determining particular media content that a user desires to experience. In an exemplary embodiment, control device 517 may comprise a remote control (or other access device having control capability (e.g., computing device 115), a wireless user device, mobile phone, etc.) that provides users with the ability to readily manipulate and dynamically modify parameters affecting the media content being viewed. In other examples, content processing device 500 may be configured for voice recognition such that content processing device 500 may be controlled with spoken utterances.

In this manner, control device 517 may include (not shown) a cursor controller, trackball, touch screen, touch pad, keyboard, and/or a key pad for activating a media application, navigating through broadcast channels, search results, and/or media content identifiers, as well as performing other control functions. For instance, control device 517 may be utilized to maximize a media application, navigate through displayable interfaces, locate/specify/retrieve media content, modify content processing device 500 parameters, or toggle through broadcast channels and/or media content identifiers. Control device 517 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, control device 517 may comprise a memory (not illustrated) for storing preferences affecting media content viewed, which can be conveyed to content processing device 500 through an input interface 519. Input interface 519 may support any type of wired and/or wireless link, e.g., infrared, radio frequency (RF), BLUETOOTH, and the like. Thus, control device 517 may store user preferences with respect to media content, such as favorite sources, etc. Alternatively, user preferences may be tracked, recorded, or stored at content processing device 500 or at a network user profile repository 111. The preferences may be automatically retrieved and activated by a user at any time. It is noted that control device 517 may be separate from content processing device 500 or may be integrated within content processing device 500, in which case certain input interface hardware and/or software may be superfluous.

Particular embodiments enable users, via control device 517, to populate or otherwise configure a user profile. For instance, a user profile application may be provided or accessed by content processing device 500 to enable users to populate a plurality of entry fields with user information. A user profile may include one or more customized or personalized settings that affect any aspect of media content accessible via content processing device 500. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible media content sources/subjects, a "blacklist" specifying one or more media content sources/subjects, as well as other equivalent customized settings, such as color schemes, sound effects, etc.

In other embodiments, the user profile may be established using the additional access devices described earlier (e.g., computing device 115, etc.). As such, user profile information may be stored at content processing device 500, e.g., at memory 513, and/or at a user site repository (not illustrated) directly connected to content processing device 500. Additionally or alternatively, profile information may be stored in a network-based repository (e.g., remote user profile repository 111), control device 303, and/or any other storage medium. Similarly, content processing device 500 (via memory 513), a user site repository, and/or a network-based repository may store a collection of digital audio, video and/or image content accumulated by a user. This collection may also include a plurality of identifiers, links, search results, or bookmarks to media content accessible over one or more communication networks 107, wherein selection of a particular identifier, link, search result, or bookmark may cause one or more media applications to obtain the content from an associated link (either directly from a data network source (e.g., content repository (not shown)) or indirectly from third-party content provider system 121 and/or MSP 119).

Figure 6:
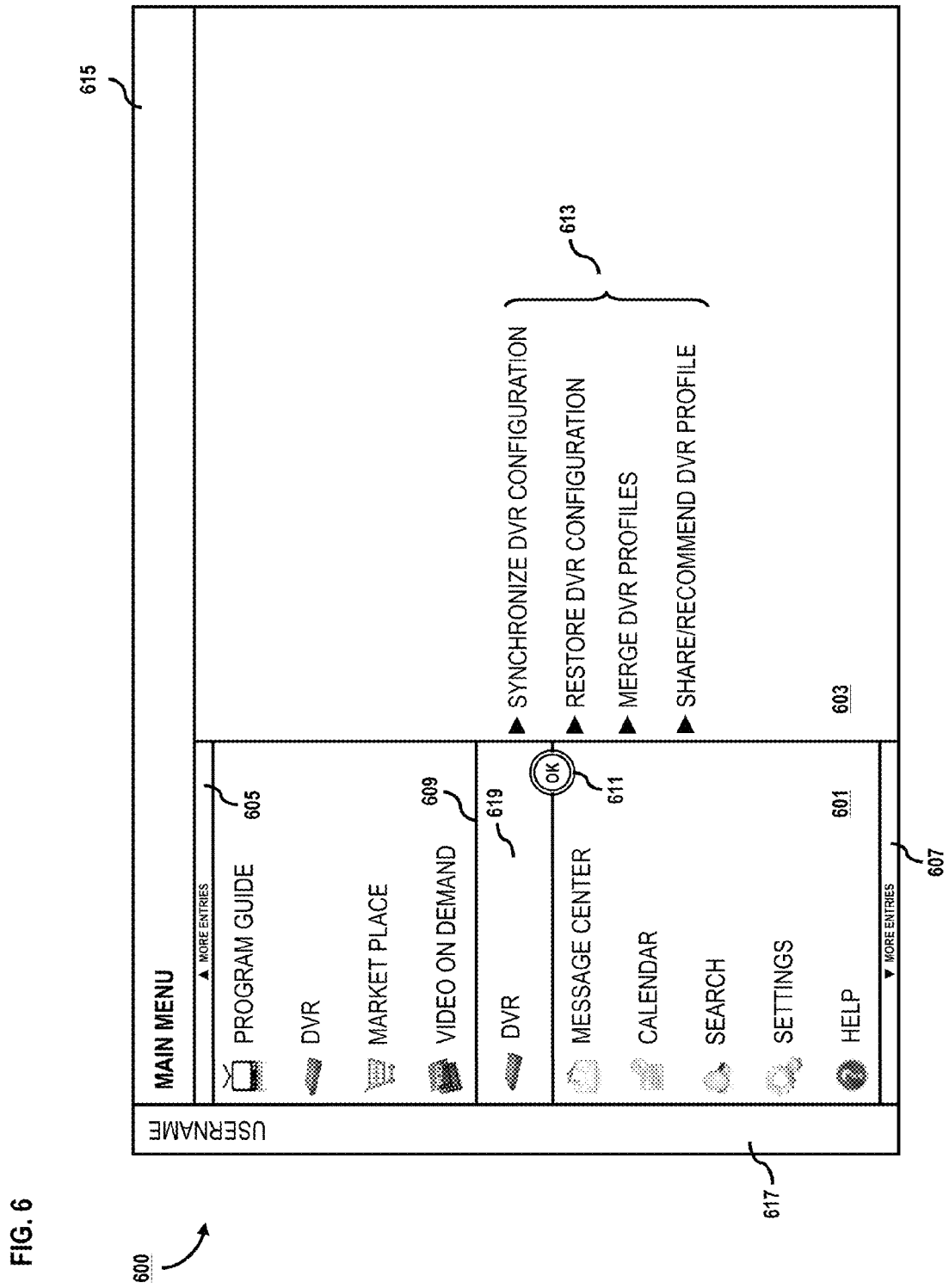
FIG. 6 is a diagram of a graphical user interface (GUI) presented via a set-top box for providing various options for managing DVR operations, according to an exemplary embodiment.

FIG. 6 is a diagram of a graphical user interface (GUI) presented via a set-top box for providing various options for managing DVR operations, according to an exemplary embodiment. GUI (or main menu) 600 may be evoked using a number of different methods. For example, a user may select a dedicated "MENU" button on control device 517 or a peripheral device communicatively coupled thereto, such as computing device 115, a mobile handset (not shown), and the like. It is recognized that any other suitable actuator of these devices may be additionally, or alternatively, used to access the functionality of main menu 600, such as triggering a "GUIDE" icon. Further, main menu 600 may be evoked by selecting an option within another interface or application, such as, for example, when navigating from a public screen (or navigational shell) to a user-specific screen, i.e., a private screen. As such, an executing device (e.g., content processing device 500, computing device 115, etc.) may require sufficient authentication information (e.g., username and password, etc.) to be input in order to access the functions of main menu 600. It is particularly noted that this authentication information may relate to authentication information associated a service provider of the virtual channel services of system 100.

As seen in FIG. 6, GUI 600, providing a "main menu," may include one or more interactive viewing panes, such as panes 601 and 603. In particular embodiments, as will be described in more detail below, the content of pane 603 may be dynamically updated to display various menu options, interaction elements, information, etc., related to user interaction within pane 601, and vice versa. In this example, however, pane 601 includes a listing of selectable entries corresponding to one or more features (or options) that may be provided via content processing device 500. For example, entries may include: program guide options, DVR options, marketplace (or shopping) options, on-demand programming options, media manager options, messaging and communications options, searching options, setting options, help options, and the like. In certain embodiments, graphical elements may be provided to correspond to one or more of these entries and, as a result, may be correspondingly displayed therewith.

One or more header 605 and footer 607 fields may be provided and configured to indicate the existence of additional entries not displayed, but navigably available. Accordingly, users may browse through the entries of user interface 600 via, for instance, control device 517 associated with content processing device 500. Further, GUI 600 may include one or more fixed focus states (such as border 609) and/or distinctive magnification features, e.g., color, brightness, bolding, font type, text size, etc., that may be used to convey a "currently" navigated position. In this manner, when a user navigates to a desired entry, actuation of, for instance, an "OK" button on control device 517 may launch (or evoke) corresponding features and/or applications associated with the particular entry. According to some embodiments, an interactive "OK" option 611 may be utilized.

Moreover, main menu 600 may include one or more additional user options 613, when a user navigates to a particular entry. As shown in user options 613, the options allow users to synchronize DVR configurations, restore DVR configurations, merge DVR profiles, or share/recommend DVR profiles. These options correspond to certain of the functions of platform 400, as described in FIG. 4. In other (or additional) embodiments, one or more aural descriptions of an entry "currently" navigated to and methods of interaction may be provided.

In certain other exemplary embodiments, main menu 600 may provide one or more navigation fields 615 and 617 to facilitate usability. For example, field 615 may provide the name of the function/option being accessed, e.g., "MAIN MENU." In this manner, when a user accesses a new function/option, field 615 may be automatically (or dynamically) updated. Field 617 may be utilized to indicate a user profile "currently" authenticated to system 100, e.g., "USER-NAME." Thus, a user may access one or more features and/or functions associated with the DVR and/or DVR management platform 101 by navigating to and selecting (or otherwise interacting with) entry 619 of main menu 600.

FIGS. 7A-7D are flowcharts of DVR processes, according to various embodiments. For the purpose of illustration, the processes are described with respect to FIG. 1, as well as exemplary user interface 600 of FIG. 6 that may be employed to facilitate the process of FIGS. 7A-7D. Although the explanation of these processes describes certain functions performed by the DVR, it is contemplated that depending on the implementation, it may be the STB coupled to the DVR (or collectively) that performs one or more steps of these processes. It is further noted that the steps of the processes may be performed in any suitable order, as well as combined or separated in any suitable manner.

Figure 7B:
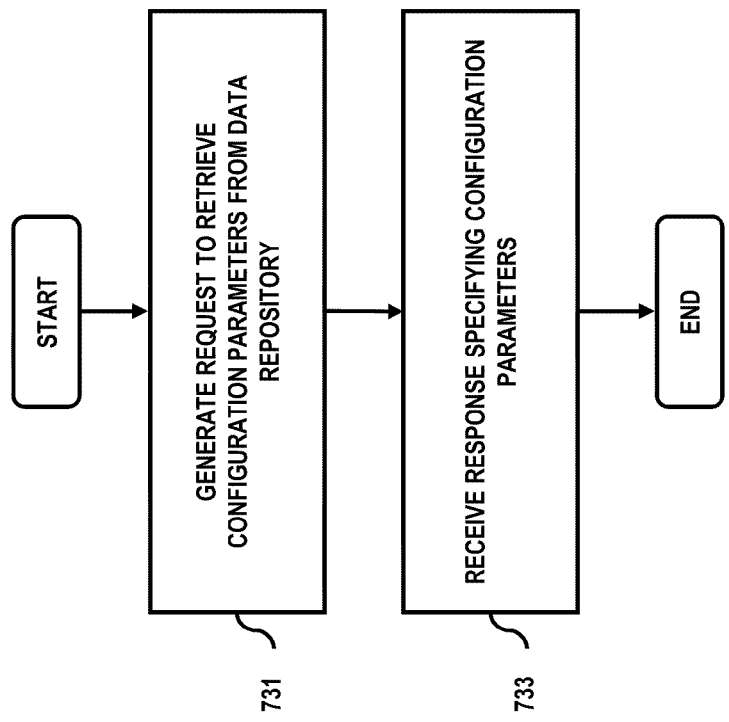
FIGS. 7A-7D are flowcharts of DVR processes, according to various embodiments.
Figure 7A:
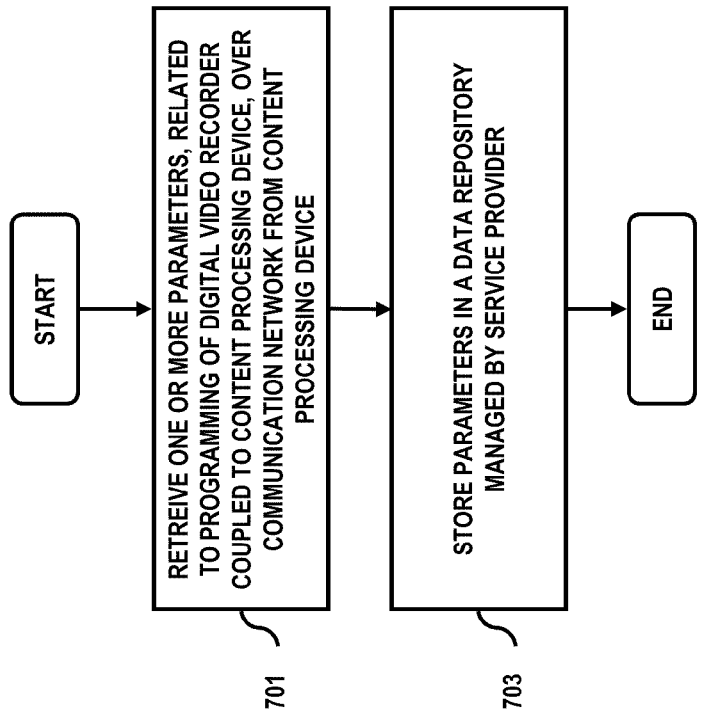

In particular, FIG. 7A is a flowchart of a process for retrieving and storing DVR parameters, according to an exemplary embodiment. At step 701, platform 101 retrieves one or more parameters, related to programming of DVR 109 coupled to content processing device 103, over a communication network (e.g., service provider network 105 and/or communication network 107) from content processing device 103 (e.g., STB). In various embodiments, the parameters may include configuration information of DVR 109, programming guide information relating to programs available via content processing device 103, user recording settings relating to a recording schedule of the programs, or a combination thereof. Subsequently, per step 703, platform 101 stores the parameters in a data repository (e.g., repository 111) managed by a service provider.

FIG. 7B is a flowchart of a process for requesting and receiving DVR parameters from a data repository (e.g., repository 111), according to an exemplary embodiment. At step 731, content processing device 103 generates a request to retrieve configuration parameters from a data repository (e.g., repository 111). Thereafter, content processing device 103, per step 733, receives a response specifying the configuration parameters.

Figure 7D:
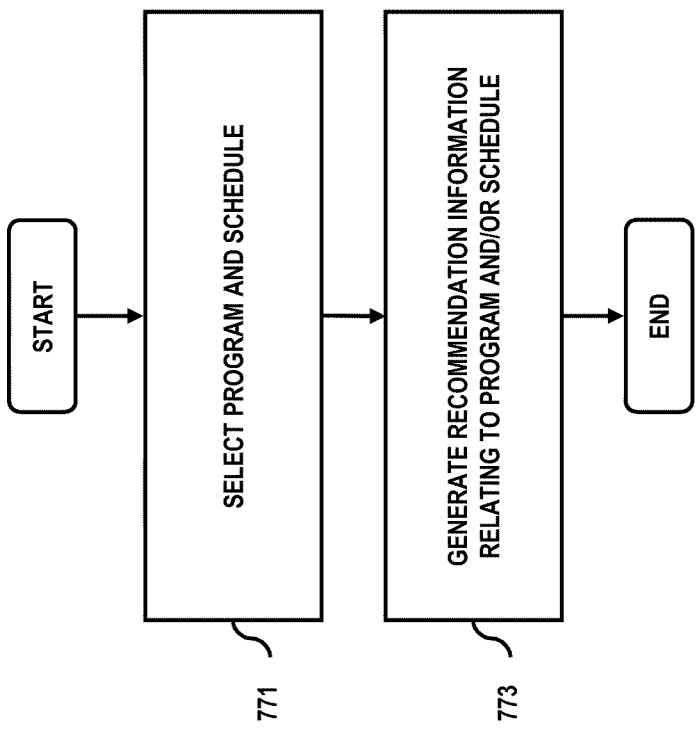
Figure 7C:
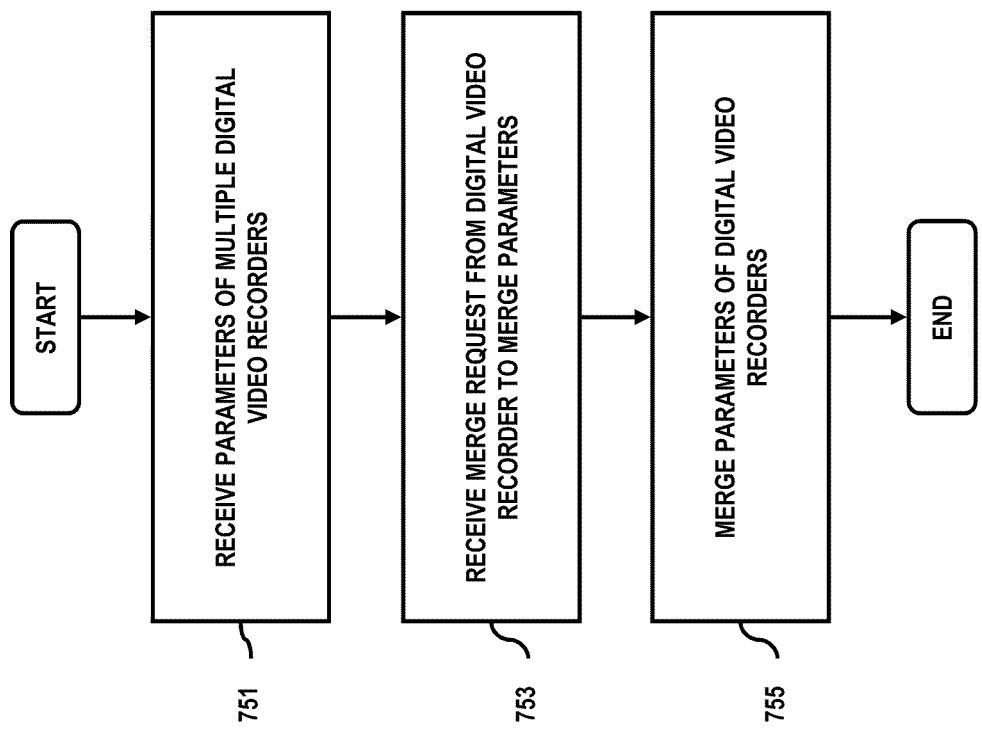

FIG. 7C is a flowchart of a process for merging parameters of multiple DVRs, according to an exemplary embodiment. At step 751, platform 101 receives parameters of multiple DVRs. According to further embodiments, platform 101 may be configured to retrieve the parameters from a database, such as repository 111, or from content processing devices 103. Platform 101, per step 753, then receives a merge request from a DVR to merge the parameters. It is noted that this request, in one embodiment, can be generated by an associated STB 103. Afterwards, in step 755, platform 101 merges the DVR parameters. Moreover, in various other embodiments, platform 101 may be configured store the merged parameters in a data repository, such as repository 111. In further embodiments, platform 101 may be configured to send the merged parameters, either automatically or on-demand, to the DVR from which the merge request was made, DVRs associated with a user profile that requested merging from the DVR from which the merge request was made, all DVRs from which platform 101 received parameters, or any combination thereof. In this manner, users have the flexibility to determine which DVR is supplemented with additional content scheduling. For example, a user may want to import his/her program scheduling on the DVR from which the request will be made or the user may want to copy program scheduling from the DVR from which the request will be made to the DVRs associated with his/her user profile, or any combination thereof.

FIG. 7D is a flowchart of a process for providing recommendations relating to programs and/or scheduling, according to an exemplary embodiment. At step 771, content processing device 103 selects a program and/or a schedule. Subsequently, in step 773, content processing device 103 generates recommendation information relating to the program and/or schedule. According to further embodiments, platform 101 may be configured to generate recommendation information based upon the selection by content processing device 103.

FIG. 8 is a flowchart of a process for mapping programming requests among different service providers, according to an exemplary embodiment. At step 801, platform 101 receives a program request. In response, per step 803, platform 101 maps the program request corresponding to a service provider from content processing device 103 to another program request corresponding to another service provider. As earlier described, this capability provides users with the capability to share DVR configuration information across different service providers. It is not uncommon for many service providers to serve a common market or neighboring markets, such that users who are physically nearby may subscribe to different service provider services. Accordingly, users can conveniently share program scheduling information despite the different programming information (e.g., channel, and time slot).

FIG. 9 is a flowchart of a process for recording and bonding a program using multiple DVRs, according to an exemplary embodiment. At step 901, the process initiates a recording of a program on a DVR 109 within user premise 113a, and then determines that there is insufficient storage space to complete recording of the program. At this point, platform 101 ceases, per step 903, recording of the program on the DVR 109, and determines another DVR 109 within user premise 113a with available space for the subject program. Thereafter, per step 905, platform 101 resumes recording of the program on this other DVR 109. In step 907, according to one embodiment, platform 101 retrieves the recordings within each DVR 109 within user premise 113a. Subsequently, in step 909, platform 101 bonds the recordings. It is contemplated that the different DVRs 109 utilized in this process need not reside within the same user premise 113a, but across multiple user premises 113a-113n; such scenario can exist with users who have multiple residences (e.g., primary residence and a vacation home, etc.).

The processes described herein for managing digital video recorders may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
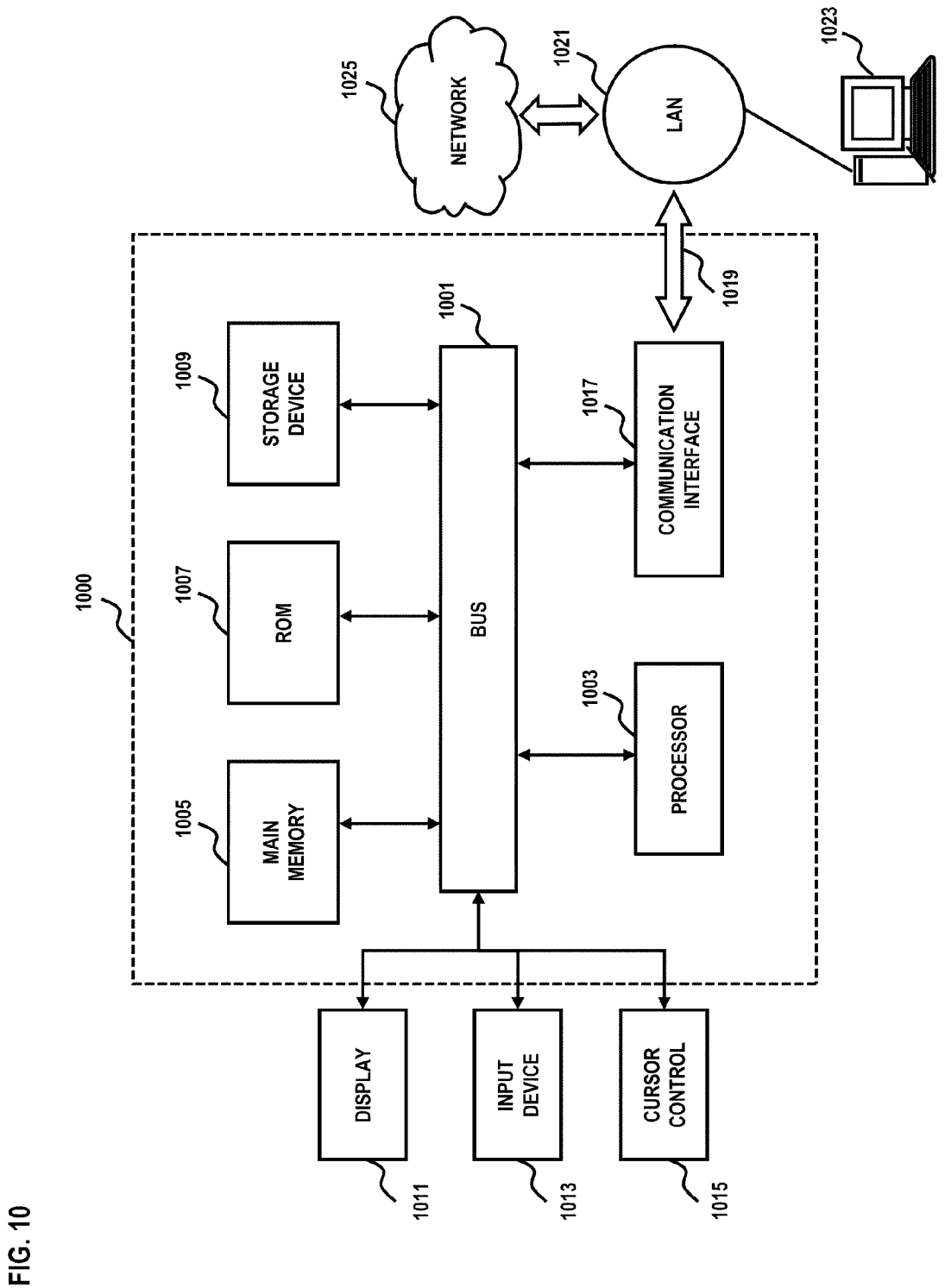
FIG. 10 is a diagram of a computer system that can be used to implement various exemplary embodiments and FIG. 11 is a diagram of a chip set that can be used to implement various exemplary embodiments.

FIG. 10 illustrates computing hardware (e.g., computer system) 1000 upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to computer-readable storage media ((or non-transitory media)—i.e., non-volatile media and volatile media), and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
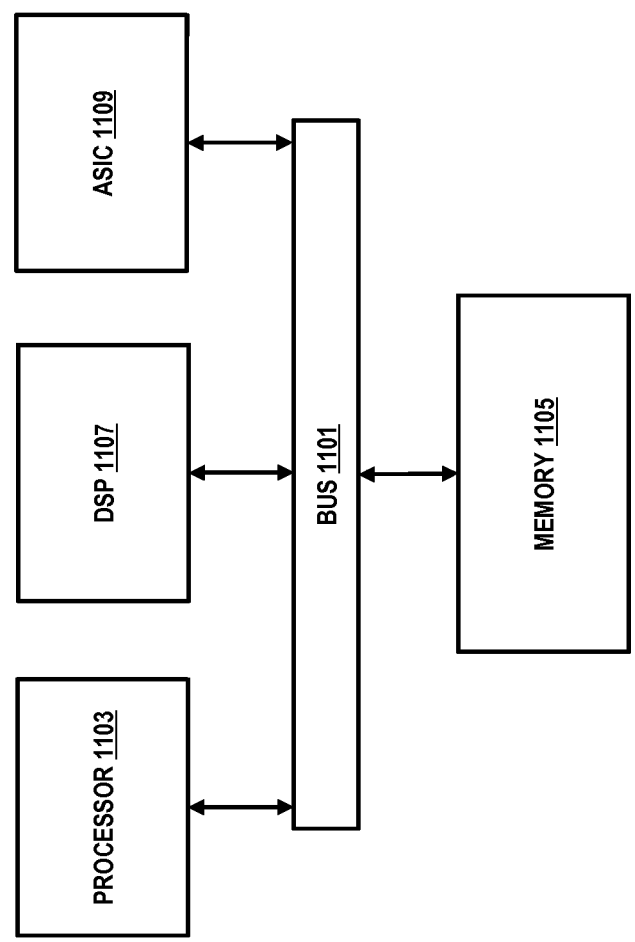

FIG. 11 illustrates a chip set 1100 upon which an embodiment of the invention may be implemented. Chip set 1100 is programmed to present a slideshow as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 2, 3, and 7-9.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
retrieving one or more parameters related to a digital video recorder, the one or more parameters including a user recording schedule to record a plurality of programs available via the set-top box that a user has previously programmed into the digital video recorder, the digital video recorder being remote from and coupled to a set-top box;
generating a configuration message for transmission over a data network to a data repository,
wherein the data repository is remote from both the digital video recorder and the set-top box, and
wherein the configuration message specifies the one or more parameters related to the digital video recorder, including the user recording schedule;
generating a request to retrieve the one or more parameters, including the user recording schedule, from the data repository; and
receiving the one or more parameters, including the user recording schedule, from the depository for storage in the digital video reorder,
wherein the one or more parameters further include digital video recorder configuration information for the digital video recorder including monitor size, audio/video interface setup, audio settings, and time zone.

2. A method according to claim 1, wherein the one or more parameters, including the user recording schedule, further include programming guide information relating to the programs available via the set-top box.

3. A method according to claim 1, further comprising:
retrieving one or more parameters related to another digital video recorder, the digital video recorder and the other digital video recorder being associated with a common user account and residing within a common user premises, the one or more parameters related to the other digital video recorder including another recording schedule to record another plurality of programs available via the set-top box that another user has previously programmed into the other digital video recorder;
generating another configuration message for transmission over the data network to the data repository,
wherein the other configuration message specifies the one or more parameters related to the other digital video recorder, including the other user recording schedule,
wherein the one or more parameters related to another digital video recorder further include digital video recorder configuration information for the other digital video recorder including monitor size, audio/video interface setup, audio settings, and time zone, and
wherein the data repository merges the recording schedule and the other recording schedule into a single list and associates the corresponding digital video recorder and a corresponding user digital video recorder profile.

4. An apparatus comprising:
a processor configured to retrieve one or more parameters related to a digital video recorder, the one or more parameters including a user recording schedule to record a plurality of programs available via the set-top box that a user has previously programmed into the digital video recorder the digital video recorder being remote from and coupled to the set-top box, wherein the processor is further configured to generate a configuration message for transmission; and a communication interface configured to transmit the configuration message over a data network to a data repository, wherein the data repository is remote from both the digital video recorder and the set-top box, and wherein the configuration message specifies the one or more parameters related to the digital video recorder, including the user recording schedule, the processor is further configured to generate a request to retrieve the one or more parameters, including the user recording schedule, from the data repository; and the communication interface is further configured to receive the one or more parameters, including the user recording schedule, from the depository for storage in the digital video recorder, wherein the one or more parameters further include digital video recorder configuration information for the digital video recorder including monitor size, audio/video interface setup, audio settings, and time zone.

5. An apparatus according to claim 4, wherein the one or more parameters, including the user recording schedule, further include programming guide information relating to the programs available via the set-top box.

6. An apparatus according to claim 4, wherein the processor is further configured to retrieve one or more parameters related to another digital video recorder, the digital video recorder and the other digital video recorder being associated with a common user account and residing within a common user premises, the one or more parameters related to the other digital video recorder including another recording schedule to record another plurality of programs available via the set-top box that another user has previously programmed into the digital video recorder;

the communication interface is further configured to transmit another configuration message for transmission over the data network to the data repository, wherein the other configuration message specifies the one or more parameters related to the other digital video recorder, including the other user recording schedule, wherein the one or more parameters related to another digital video recorder further include digital video recorder configuration information for the other digital video recorder including monitor size, audio/video interface setup, audio settings, and time zone, and wherein the data repository merges the recording schedule and the other recording schedule into a single list and associates the corresponding digital video recorder and a corresponding user digital video recorder profile.

7. A method comprising:

receiving one or more parameters over a communication network from a set-top box, wherein the one or more parameters include a user recording schedule to record a plurality of programs available via the set-top box that a user has previously programmed into a digital video recorder and further include digital video recorder configuration information for the digital video recorder including monitor size, audio/video interface setup, audio settings, and time zone, the digital video recorder being remote from and coupled to a set-top box;

storing the one or more parameters, including the user recording schedule, in a data repository that is managed by a service provider;

receiving a request from the set-top box to send the stored one or more parameters, including the user recording schedule, to the set-top box, and sending the stored one or more parameters, including the user recording schedule, to the set-top box in response to the request.

8. A method according to claim 7, further comprising:

receiving, from another set-top box, one or more parameters, including another user recording schedule of another digital video recorder;

receiving a merge request from one of the digital video recorders to merge the one or more parameters, including the user recording schedule and the other user recording schedule of both digital video recorders; and merging the one or more parameters, including the user recording schedule and the other user recording schedule of both the digital video recorders in response to the merge request, wherein the merging includes associating the corresponding digital video recorder and corresponding user digital video recorder profile.

9. A method according to claim 7, wherein there are a plurality of digital video recorders associated with a common user account.

10. A method according to claim 9, wherein each of the plurality of digital video recorders is a separate device having its own memory, the method further comprising:

receiving a record request from one of the digital video recorders; and determining an available record slot among the plurality of digital video recorders in response to the record request.

11. A method according to claim 7, further comprising:

initiating recording of a program on one of the digital video recorders;

ceasing the recording of the program on the one digital video recorder;

resuming the recording of the program on another one of the digital video recorders;

retrieving the recordings within each of the digital video recorders; and bonding the recordings.

12. A method according to claim 7, further comprising:

generating recommendation information relating to a program, wherein the recommendation information provided by the set-top box for transmission to another set-top box.

13. A method according to claim 7, further comprising:

mapping a program request corresponding to the service provider from one of the set-top boxes to another program request corresponding to another service provider.

14. An apparatus comprising:

a communication interface configured to receive one or more parameters over a communication network from a set-top box, wherein the one or more parameters include a user recording schedule to record a plurality of programs available via the set-top box that a user has previously programmed into a digital video recorder and further include digital video recorder configuration information for the digital video recorder including monitor size, audio/video interface setup, audio settings, and time zone, the digital video recorder being remote from and coupled to a set-top box; and a processor configured to initiate storage of the parameters in a data repository that is managed by a service provider, wherein the communication interface is further configured to receive a request from the set-top box to send the stored one or more parameters, including the user recording schedule, to the set-top box, and wherein the processor is further configured to initiate sending the stored one or more parameters, including the user recording schedule, to the set-top box in response to the request.

15. An Apparatus according to claim 14, wherein the communication interface is further configured to receive, from another set-top box, one or more parameters, including another user recording schedule of another digital video recorder, and to receive a merge request from one of the digital video recorders to merge the one or more parameters, including the user recording schedule and the other user recording schedule of both digital video recorders, and the processor being further configured to merge the one or more parameters, including the user recording schedule and the other user recording schedule of both digital video recorders, wherein the merge includes associating the corresponding digital video recorder and corresponding user digital video recorder profile.

16. A method according to claim 1, wherein the remote data repository is connected to a digital video recorder platform that is in communication with the set-top box, wherein the user subscribes to two or more different service provides, and wherein digital video recorder platform maps program scheduling information corresponding to a record request for one of the two or more different service providers to identify an identical program in another of the two or more different service providers.

* * * * *